July 22, 1958
H. J. BOWMAN ET AL
2,844,705
WELDING METHOD AND APPARATUS
Filed Dec. 29, 1955
3 Sheets-Sheet 1
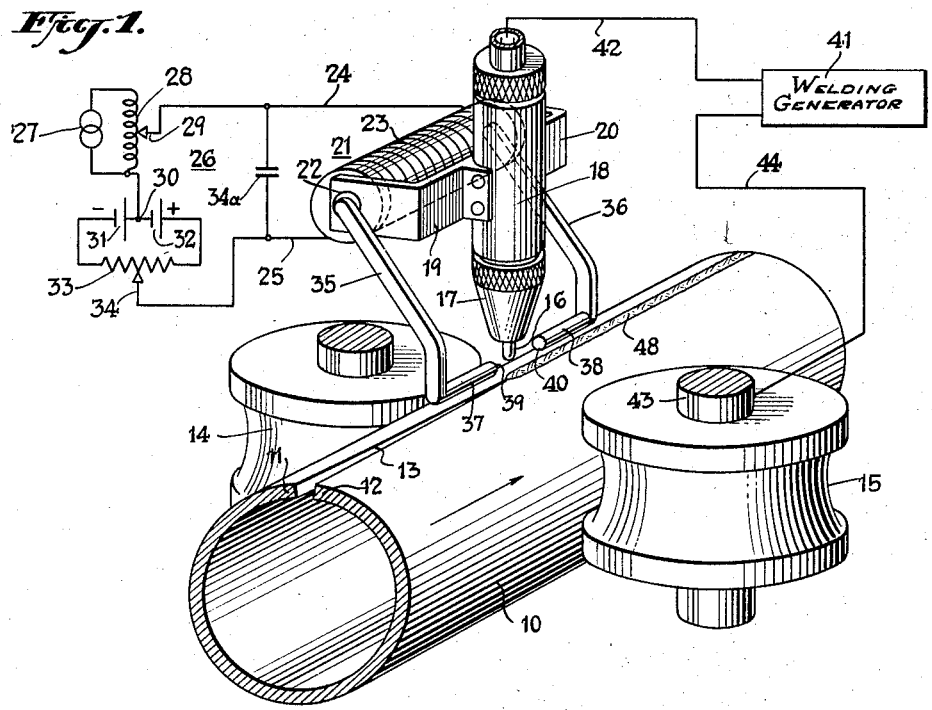
Fig. 1.
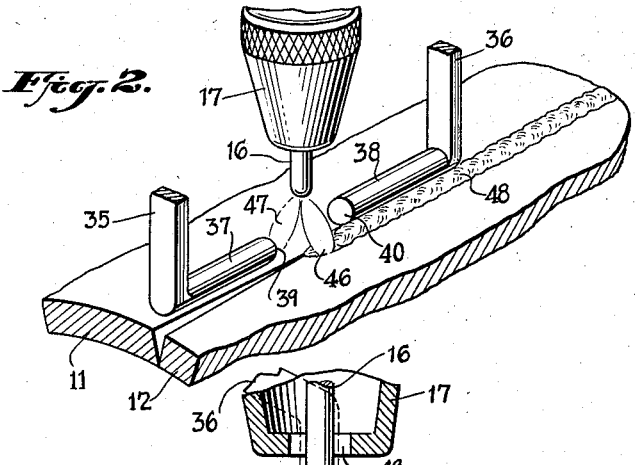
Fig. 2.
Fig. 3.
INVENTOR.
HOWARD J. BOWMAN,
BY ELMER W. WILLIAMS.
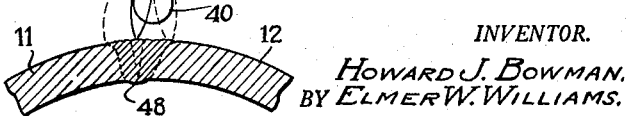
ATTORNEYS.

July 22, 1958  H. J. BOWMAN ET AL  2,844,705
WELDING METHOD AND APPARATUS
Filed Dec. 29, 1955  3 Sheets-Sheet 2
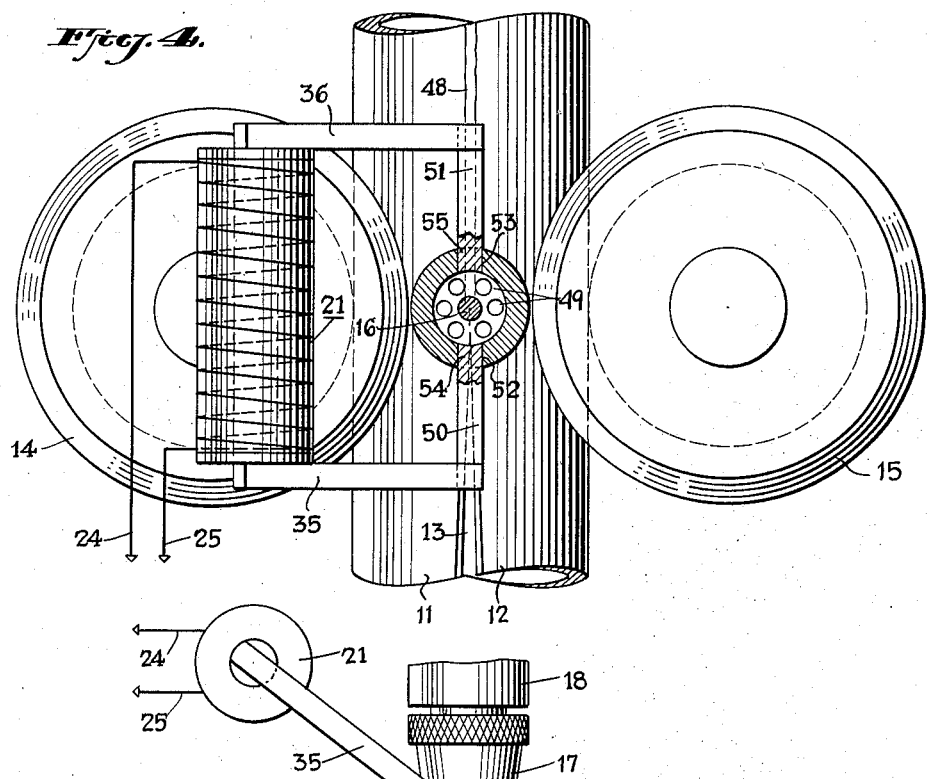
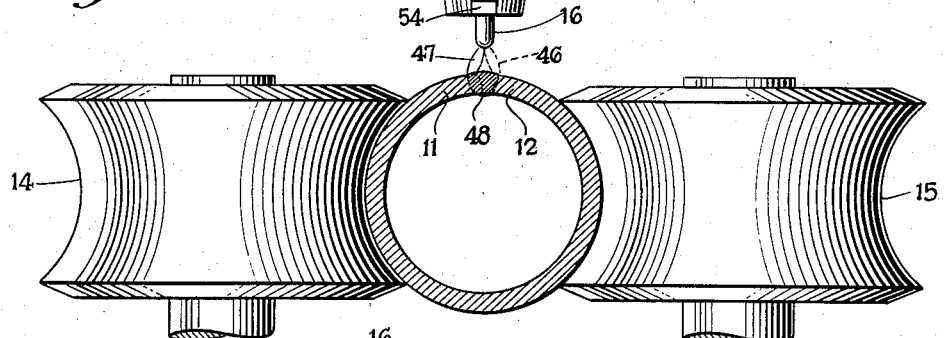
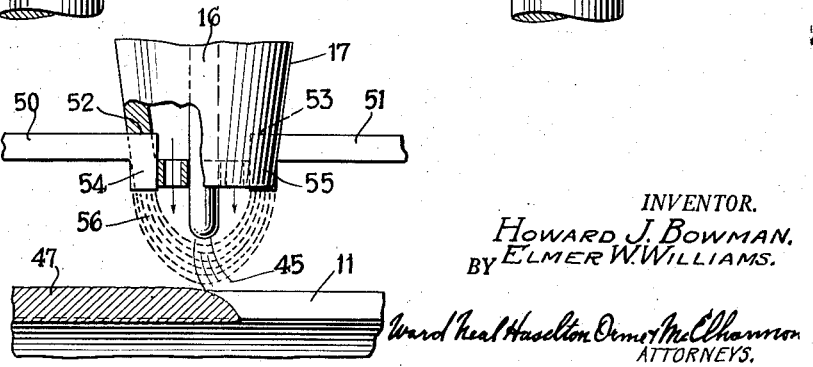
INVENTOR.
HOWARD J. BOWMAN.
BY ELMER W. WILLIAMS.
ATTORNEYS.

July 22, 1958  H. J. BOWMAN ET AL  2,844,705
WELDING METHOD AND APPARATUS
Filed Dec. 29, 1955  3 Sheets-Sheet 3
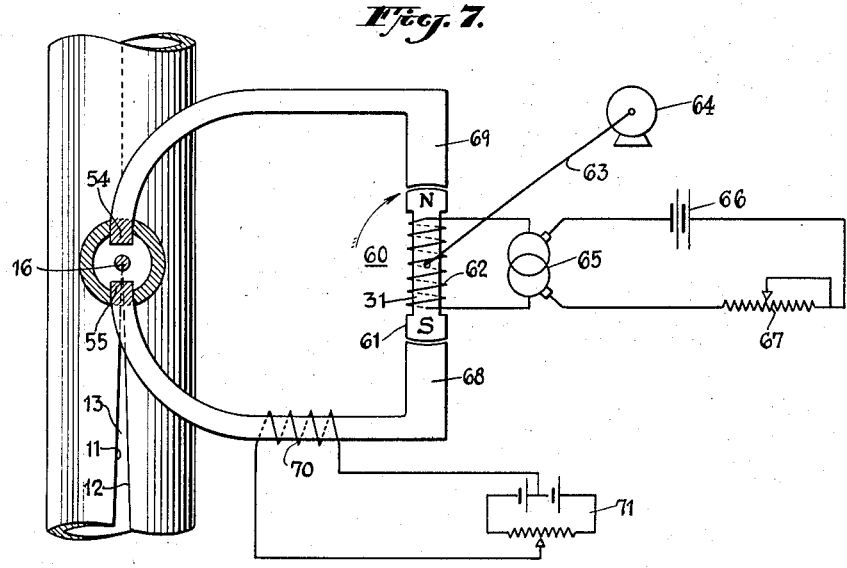
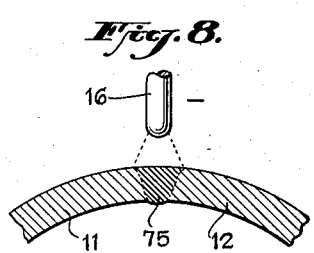
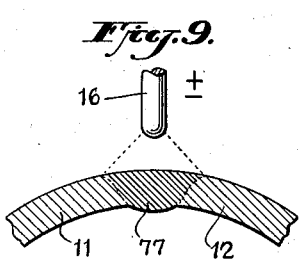
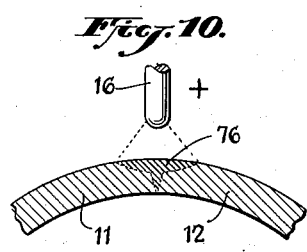
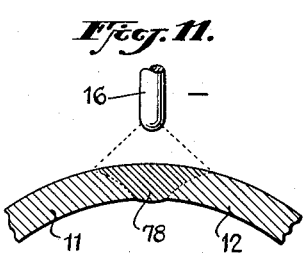
INVENTOR.
HOWARD J. BOWMAN.
BY ELMER W. WILLIAMS.
Ward, Neal, Haselton Orme & McClhannon
ATTORNEYS.

United States Patent Office 2,844,705
Patented July 22, 1958

2,844,705
WELDING METHOD AND APPARATUS

Howard J. Bowman, East Troy, and Elmer W. Williams, Muskego, Wis., assignors to Trent Tube Company, East Troy, Wis., a corporation of Wisconsin Application December 29, 1955, Serial No. 556,174

10 Claims. (Cl. 219—61)

This invention pertains to improvements in methods and apparatus for the welding of metal tubing formed with a welded longitudinal seam.

The invention pertains more particularly to such improvements as applied to welding the longitudinal seam of metal tubing by employment of mechanized welding, utilizing an inert gas-shielded arc and a non-consumable welding electrode, such as tungsten or the like.

In the production of welded seam tubing in accordance with conventional practices, initially flat strip or plate raw stock is formed into cylindrical tubular configuration with the opposite longitudinal edges abutting in a longitudinally extending seam, and the thus formed tube fed between squeeze rolls past a stationarily mounted arc welding electrode, disposed substantially in alignment with the tube seam, whereby the abutting edges of the tubing are joined in a fusion weld, in the manner described more particularly in U. S. Patent 2,716,692, issued to the applicants herein.

In welding in accordance with such conventional practices, there is a tendency for the arc to wander or meander in random fashion transversely across the open tube seam from one side to the other, due to various factors, such for example as slight variations in the conductivity or permeability or both of the tubing from point to point, depending on the material being welded, also due to slight irregularities in the abutting edges of the tubing resulting from such factors as slight irregularities in the sheared edges of the abutting stock and also due to the forming operations.

As a result of these factors, as the welding current flows from the arc electrode to and through the tubular stock, or vice versa, magnetic fields of varying intensity are established surrounding the arc and also surrounding the tubing which, at any given instant may variably oppose or attract one another, as a result of which the arc, being mobile, is displaced in the manner aforesaid with reference to the tube seam.

Now we proposed in accordance with the crux of the present invention, to eliminate this random meandering of the arc by oscillating the same at a uniform rate transversely back and forth across the tube seam, with respect to a median position of the arc traverse, which is centered over the tube seam, thereby to assure uniform and equal heating of both abutting edges of the tubing and thus as a result, to assure the production of a uniform weld extending longitudinally along the seam.

The arc may thus be oscillated either mechanically, as by movably mounting the welding electrode for oscillation by a motor driven bell crank or an eccentric and crank shaft assembly or the like, or it may be oscillated electrically as by means of a magnetic field of varying intensity and reversing polarity so directed as to sweep the arc transversely back and forth across the tube seam.

In our preferred embodiment of the invention, the arc is oscillated magnetically, at a uniform rate, transversely of the weld seam, by means of a magnetic field which varies sinusoidally in magnitude and polarity at constant frequency, which field penetrates the arc in a direction substantially parallel to the weld seam, thereby to sweep the arc sinusoidally back and forth transversely to the tube seam in accordance with the varying intensity and direction of the magnetic field.

For providing the variable magnetic field aforesaid in accordance with one embodiment of the invention, there is mounted on, or adjacent to, the welding electrode holder, an electromagnet comprising a magnetic core element of ferrous or other magnetic material surrounded by an energizing coil, this core element having extending from opposite ends thereof a pair of arms which terminate in a pair of opposed pole pieces which are disposed in axial alignment along the weld seam and on opposite sides, respectively, of the welding electrode. The coil may be energized from any suitable source of alternating current voltage of the desired frequency, for example about 5 to 60 cycles per second, depending on the rate of tube feed past the welding electrode. For adjustably centering the median point of arc traverse opposite the tube seam, the energizing coil of the electromagnet may also be supplied, in accordance with a further feature of the invention, with a direct current biasing voltage, arranged to be variably adjusted in magnitude in both the positive and negative directions of potential.

In accordance with a modified construction, the tip of the welding electrode holder through which the welding electrode projects may be made of a non-magnetic material, such as brass, and slotted on its opposite sides for reception of the electromagnetic pole pieces mounted therein, as by brazing, with their pole faces in alignment with the tube seam and flush with the face of the welding tip. With this modification the lines of magnetic flux in passing from one pole face to the other will, as in the previous modification, penetrate the arc parallel to the tube seam and thus sweep the arc transversely across the seam.

Having thus described the invention in general terms, reference will now be had, for a more detailed description, to the accompanying drawings, wherein:

Figure 1 is a view partly in perspective and partly diagrammatic, illustrating the first embodiment above described for magnetically oscillating the arc across the tube seam. Figure 2 is a fragmentary detail in perspective of the Figure 1 showing, while Figure 3 is a fragmentary transverse sectional elevation of the Figure 1 showing as taken at the axial plane which passes through the welding electrode and holder perpendicular to the axis of the tubing.

Figure 4 is a plan view partially in section, while Figure 5 is an end elevation, partly in section, of the second modification above described for magnetically sweeping the arc across the tube seam. Figure 6 is an enlarged fragmentary detail in side elevation and with parts broken away of the Figures 4 and 5 showings, to illustrate the manner in which the pole pieces are mounted in the brass welding tip of the electrode holder.

Figure 7 is a diagrammatic plan view of a further modification of the invention according to which variation in intensity and polarity of the magnetic field is effected by means of a motor driven rotatably mounted electromagnet.

Figures 8–11, inc., are fragmentary showings in transverse section through the tubing at the point of the welding electrode, to illustrate the manner in which the fusion weld is formed during operation of the equipment by reference to conventional welding practices employing direct current and also alternating current supplied to the welding electrode.

Referring to Figures 1 to 3, there is shown a section of metal tubing 10 formed as previously described from initially flat metal plate or strip, into tubular configuration with its opposite edges 11, 12 abutting to form a longitudinally extending seam 13. The tubing is fed in the direction of the arrow between a pair of squeeze rolls 14, 15 beneath a non-consumable arc welding electrode 16, of tungsten or the like mounted in the tip 17 of an electrode holder 18. Mounted on the electrode holder are brackets 19, 20, of non-magnetic material such as brass, between which in turn is mounted an electromagnet 21 composed of a core 22 of magnetic material, such as mild steel, Permalloy or the like, said core having wound thereabout a coil 23, the opposite terminals of which are connected, respectively, over conductors 24, 25, to an oscillator and biasing circuit 26. This circuit comprises a source of alternating current voltage 27 of the required frequency, usually about 10 to 60 cycles per second, across the output of which is bridged an auto-transformer 28, variably tapped, as at 29, to the upper conductor 24 extending to the electromagnet coil. The lower end of the auto-transformer is connected, as at 30, between a pair of direct current batteries 31, 32 or other suitable sources of direct current voltage, across which is bridged the fixed arm 33 of a potentiometer, the adjustable arm 34 of which is connected to the lower conductor 25 which extends to the electromagnet coil. A condenser 34a is bridged between the conductors 24, 25, to form with coil 28 a tuned circuit which is resonant at the fundamental frequency of oscillator 27 thus to suppress harmonics and impress on the electromagnet 21 a substantially pure sine wave of the oscillator frequency.

Reverting to the electromagnet 21, the magnetic core 22 thereof has integral with its opposite ends, a pair of downwardly extending arms 35, 36, of magnetic material as aforesaid, these arms having integral with their lower ends a pair of pole pieces 37, 38 which extend inwardly of the arms in opposed axial alignment as shown, with their pole faces 39, 40 positioned adjacent to and on opposite sides, respectively, of the welding electrode 16. The pole pieces 37, 38 are also mounted in alignment with the tube seam 13 in closely spaced relationship thereto as shown.

The welding electrode is energized from a welding generator 41, the output terminals of which are connected respectively to the welding electrode 16 via conductor 42, and to some stationary part of the feed apparatus which is grounded to the tubing, such as the stationary shaft 43 of the feed roll 15, via conductor 44.

In the operation of this modification of the invention, the arc is struck in the usual manner between the welding electrode 16 and the tubing 10 to provide an arc as shown at 45 of Figure 3. The alternating current supplied from the source 27 to the coil 23 of the electromagnet, varies the magnetic flux in the core thereof sinusoidally in magnitude and polarity in accordance with the energizing current, thus to produce a magnetic field in the space between the pole faces 39, 40 which varies corespondingly in intensity and polarity. This magnetic field influences the magnetic field surrounding the arc 45 and thus sweeps the arc transversely back and forth across the tube seam between the limiting dotted line positions 46, 47 of Figures 2 and 3. When operation is thus established, the variable arm 34 of the potentiometer is adjusted to a point on the fixed arm 33 such that the median position of the traverse of the arc sweep between its limiting positions 46 and 47, is centered over the tube seam 13. This assures that as the tubing 10 is fed at a uniform rate by means of the squeeze rolls 14, 15, past the welding electrode 16, both abutting edges 11, 12 of the tube will be equally heated, as the arc sweeps transversely back and forth, thus to provide a uniform fusion weld 48 extending longitudinally along the tube seam 13 as shown. During welding a stream of an inert gas such as helium, is supplied to the arc in the conventional manner through the opening 49 in the welding tip 17.

Referring to the modifications of Figs. 4-6, inc., wherein like elements are similarly designated as in Figs. 1-3, inc., the core arms 35, 36, have integral with their lower extremities, respectively, a pair of inwardly extending pole pieces 50, 51, which extend into slotted cutouts 52, 53, formed in the lower end of the welding tip 17. The terminal ends of these pole pieces extend downwardly within the slotted cutouts, as at 54, 55, and terminate substantially flush with the lower face of the welding tip 17, in the manner shown more particularly in Fig. 6. The welding tip 17 is made of a non-magnetic material, such as brass, and is mounted with the pole pieces 54, 55, in alignment with the weld seam as shown.

With this arrangement, some of the lines of magnetic flux which extend in space between the pole pieces 54, 55, will influence the field around the arc 45 in the manner indicated by the dotted lines 56 of Fig. 6 and in the direction of the tube seam 13. In consequence the arc will, as in the previous modification, be oscillated back and forth across the tube seam between limiting positions, as at 46, 47, of Fig. 5, as the energizing current in the coil of the electromagnet 21, varies in intensity and direction.

Fig. 7 shows an extremely simple modification for sinusoidally varying at a frequency desired the magnetic field supplied to the pole pieces of either of the previously described modifications. In this modification, an electromagnet 60, consisting of a magnetic core 61 and surrounding coil 62, is mounted to rotate on a shaft 63, driven by a variable speed motor 64. Coil 62 is supplied with energizing current through slip rings 65, from a direct current source 66, in series with an adjustable load resistance 67. The electromagnet 60 rotates between a pair of stationary arms 68, 69, of magnetic material, which extend, as previously described, to opposed pole pieces 54, 55, mounted in alignment with the tube seam 13 on opposite sides, respectively, of the welding electrode 16.

Rotation of electromagnet 60 at constant speed produces a sinusoidally varying magnetic field in the space between the pole pieces 54, 55, and of a frequency determined by the speed of rotation of motor 64, thus to sweep the arc transversely of the weld seam at that frequency and in the manner above described. For centering the arc a biasing magnetic field is supplied by means of a coil 70 encircling one or both of the arms 68, 69, this coil being supplied from a biasing battery and potentiometer arrangement 71 like that of 33, 34, Fig. 1.

Referring to Figs. 8-10 illustrative of conventional arc welding procedures, if the welding electrode 16 is supplied with direct current of a potential which is negative with respect to the tubing, a weld 75, Fig. 8, results having fairly straight sides. If, as in Fig. 10, the welding electrode is positive with respect to the tubing, the melt is shallow and broad, as at 76. The application of alternating current to the welding electrode as in Fig. 9, combines the two melts into one which is fairly broad and yet has depth as at 77, Fig. 9. By employing the oscillating arc of the present invention the width and depth of the melt is controlled by the traverse of the arc sweep to provide a melt as at 78, Fig. 11, which combines depth with a desired width by employment of direct current on the welding electrode.

What is claimed is:

1. A method of fusion welding abutting edges of tubular stock formed with a longitudinally extending seam of said abutting edges, and by means of a non-consumable arc welding electrode, which comprises: progressively feeding said stock longitudinally past said electrode, with said seam in close proximity to said electrode and while maintaining an arc therebetween, and concurrently subjecting said arc to a magnetic field of varying intensity and polarity defined in a longitudinally extending zone disposed in the general direction of feeding, thereby concurrently sweeping said arc transversely back and forth across said seam without requiring movement of said welding electrode.

2. A method of fusion welding abutting edges of tubular stock formed with a longitudinally extending seam of said abutting edges, and by means of a non-consumable arc welding electrode, which comprises: progressively feeding said stock at a uniform rate longitudinally past said electrode with said seam in close proximity thereto and while maintaining an arc between said electrode and tubing, and concurrently subjecting said arc to a magnetic field of uniformly varying polarity and intensity defined in a longitudinally extending zone disposed in the general direction of feeding, thereby sweeping said arc at a uniform periodicity transversely back and forth across said seam.

3. A method of fusion welding abutting edges of tubular stock formed with a longitudinally extending seam of said abutting edges, and by means of a non-consumable arc welding electrode, which comprises: progressively feeding said stock at a uniform rate longitudinally past said electrode with said seam in close proximity thereto and while maintaining an arc between said electrode and tubing, and concurrently subjecting said arc to a magnetic field defined in a longitudinally extending zone disposed in the general direction of feeding having a component of sinusoidally varying intensity and polarity and a component of uniform intensity and polarity, thereby to sweep said arc transversely back and forth across said seam and bias said arc from the axis of said welding electrode in a plane substantially normal to the direction of feeding.

4. Apparatus for fusion welding abutting edges of metal tubing formed with a longitudinally extending seam of said abutting edges, comprising: a stationarily mounted non-consumable arc welding electrode, means for progressively feeding said tubing past said electrode with said seam disposed substantially in alignment therewith, means for maintaining an arc between said electrode and tubing during said feeding, and means for oscillating said arc back and forth across said seam during said feeding, said means including an electromagnet having a pair of pole pieces disposed substantially in alignment with the direction of tube feed and on opposite sides, respectively, of said welding electrode, means for energizing said electromagnet including a source of alternating current voltage for oscillating said arc and adjustable biasing means including a source of direct current voltage for adjustably centering said arc with respect to said tube seam.

5. Apparatus for fusion welding abutting edges of metal stock with a longitudinally extending seam of said abutting edges comprising: a non-consumable arc welding electrode, means for relatively moving said stock and said electrode with said seam and said electrode in substantial alignment, means for maintaining an arc between said electrode and said work and means for oscillating said arc back and forth across said seam during movement, said means including an electromagnet having a pair of pole pieces disposed adjacent the lower end of said electrode on opposite sides thereof and in substantial alignment with said electrode in the direction of movement, and a current of varying intensity and polarity, and a current of uniform polarity energizing said electromagnet.

6. Apparatus for fusion welding abutting edges of metal stock with a seam of said abutting edges comprising: a non-consumable arc welding electrode, means for relatively moving said stock and said electrode with said seam and electrode in substantial alignment, means for maintaining an arc between said electrode and said work and means for oscillating said arc back and forth across said seam during movement, said means including an electromagnet having a pair of pole pieces disposed adjacent the lower end of said electrode on opposite sides thereof and in substantial alignment with said seam, and a source of current of varying intensity and periodically reversing polarity for energizing said electromagnet.

7. Apparatus for fusion welding abutting edges of metal stock with a seam of said abutting edges comprising: a non-consumable arc welding electrode, means for relatively moving said stock and said electrode, means for maintaining an arc between said electrode and said work, means for producing a magnetic field of varying intensity extending transversely of the arc path and in the direction of relative movement comprising an electromagnet having a pair of pole pieces arranged transversely of the path of said arc and extending in the direction of movement, and a source of current of varying intensity and polarity for energizing said electromagnet.

8. A method of fusion welding abutting edges of metal stock formed with a longitudinally extending seam of said abutting edges, and by means of a non-consumable arc welding electrode, which comprises: progressively feeding said stock past said electrode with said seam in close proximity thereto and while maintaining an arc between said electrode and tubing, and concurrently subjecting said arc to a magnetic field of varying intensity and periodically reversing polarity defined in a longitudinally extending zone disposed in the general direction of feeding, thereby sweeping said arc transversely back and forth across said seam without requiring movement of said welding electrode.

9. A method of fusion welding abutting edges of metal stock formed with a longitudinally extending seam of said abutting edges, and by means of a non-consumable arc welding electrode, which comprises: progressively feeding said stock longitudinally past said electrode with said seam in close proximity thereto and while maintaining an arc between said electrode and tubing, and concurrently subjecting said arc to a magnetic field defined in a longitudinally extending zone disposed in the general direction of feeding, having a component of varying intensity and polarity and a component of uniform polarity, thereby to sweep said arc transversely back and forth across said seam and bias said arc from the axis of said welding electrode in a plane substantially normal to the direction of feeding.

10. A method of fusion welding abutting edges of metal stock formed with a seam of said abutting edges, and by means of a non-consumable arc welding electrode, which comprises: initiating relative movement between said stock and said electrode with said seam in close proximity thereto while maintaining an arc between said electrode and stock, and concurrently subjecting said arc to a magnetic field defined in a longitudinally extending zone disposed in the general direction of movement, having a component of varying intensity and periodically reversing polarity and a component of uniform intensity, thereby to sweep said arc transversely back and forth across said seam and bias said arc from the axis of said welding electrode in a plane substantially normal to the direction of movement.

References Cited in the file of this patent

UNITED STATES PATENTS

| Number | Name | Date |
| --- | --- | --- |
| 571,463 | Thomson | Nov. 17, 1896 |
| 1,029,389 | Metzger | June 11, 1912 |
| 1,298,590 | Smith | Mar. 25, 1919 |
| 1,787,600 | Strobel | Jan. 6, 1931 |
| 1,933,340 | Raymond | Oct. 31, 1933 |
| 1,956,406 | Vars | Apr. 24, 1934 |
| 2,001,179 | Brugge | May 14, 1935 |
| 2,040,215 | Rava | May 12, 1936 |
| 2,065,023 | Rao | Dec. 22, 1936 |
| 2,139,160 | Hebeler | Dec. 6, 1938 |
| 2,152,194 | Jones | Mar. 28, 1939 |
| 2,591,809 | Hanson | Apr. 8, 1952 |
| 2,654,014 | Schaefer | Sept. 29, 1953 |
| 2,666,122 | Curtin et al. | Jan. 12, 1954 |

FOREIGN PATENTS

| Number | Country | Date |
| --- | --- | --- |
| 596,469 | Germany | May 2, 1934 |